United States Patent
Sillapacharn et al.

(10) Patent No.: US 9,803,460 B2
(45) Date of Patent: Oct. 31, 2017

(54) WELLHEAD PLATFORM SYSTEMS FOR USE IN EXTRACTING AND TESTING MULTI-PHASE RAW MIXTURES

(71) Applicant: PTT EXPLORATION AND PRODUCTION PUBLIC COMPANY LIMITED, Bangkok (TH)

(72) Inventors: Thitinun Sillapacharn, Bangkok (TH); Choosak Kokanutranont, Bangkok (TH); Chanwith Buntoengpesuchsakul, Bangkok (TH); Tanadcha Therdwikrant, Bangkok (TH); Peeradet Aroonsangob, Bangkok (TH)

(73) Assignee: PTT Exploration and Production Public Company Limited, Bangkok (TH)

( * ) Notice: Subject to any disclaimer, the term of this patent is extended or adjusted under 35 U.S.C. 154(b) by 17 days.

(21) Appl. No.: 14/912,849

(22) PCT Filed: Jun. 9, 2015

(86) PCT No.: PCT/TH2015/000034
§ 371 (c)(1),
(2) Date: Feb. 18, 2016

(87) PCT Pub. No.: WO2016/200341
PCT Pub. Date: Dec. 15, 2016

(65) Prior Publication Data
US 2017/0159421 A1    Jun. 8, 2017

(51) Int. Cl.
*E21B 43/34*    (2006.01)
*E21B 47/00*    (2012.01)
(Continued)

(52) U.S. Cl.
CPC .......... *E21B 43/34* (2013.01); *B01D 19/0063* (2013.01); *B01D 53/30* (2013.01); *E21B 47/00* (2013.01); *G05D 7/06* (2013.01)

(58) Field of Classification Search
None
See application file for complete search history.

(56) References Cited

U.S. PATENT DOCUMENTS

| 7,988,384 | B2 | 8/2011 | Baugh et al. |
| 8,245,787 | B2 | 8/2012 | White |

(Continued)

OTHER PUBLICATIONS

International Search Report and Written Opinion, PCT/TH2015/000034, dated Nov. 23, 2015.

*Primary Examiner* — Amber R Orlando
*Assistant Examiner* — Phillip Shao
(74) *Attorney, Agent, or Firm* — Baker & McKenzie LLP

(57) ABSTRACT

Example embodiments include systems for use in a wellhead platform. The system may comprise a separator subsystem, a scrubber subsystem, a first stage compressor subsystem, and a second stage compressor subsystem. The separator subsystem may comprise a separator inlet section for receiving multi-phase raw mixtures, a separator container body for housing the received multi-phase raw mixture, and a separator gas outlet section for separating gas. The scrubber subsystem may comprise a scrubber inlet section connected to the separator gas outlet section, a scrubber container body, and a scrubber gas outlet section for separating gas. The first stage compressor subsystem may be operable to receive gas separated from the scrubber subsystem, compress the received gas, and output the compressed gas. The second stage compressor subsystem may be operable to receive compressed gas from the first stage compressor subsystem, further compress the received compressed gas, and output the further compressed gas.

5 Claims, 9 Drawing Sheets

(51) Int. Cl.
    *B01D 53/30*     (2006.01)
    *B01D 19/00*     (2006.01)
    *G05D 7/06*     (2006.01)

(56) References Cited

U.S. PATENT DOCUMENTS

| | | |
|---|---|---|
| 8,327,941 B2 | 12/2012 | Hackworth et al. |
| 2009/0014170 A1 | 1/2009 | Zubrin et al. |
| 2011/0168402 A1 | 7/2011 | Nadarajah et al. |
| 2012/0223839 A1 | 9/2012 | Kobata et al. |
| 2013/0312614 A1 | 11/2013 | Abidin et al. |

WELLHEAD PLATFORM SYSTEMS FOR USE IN EXTRACTING AND TESTING MULTI-PHASE RAW MIXTURES

BACKGROUND

The present disclosure relates generally to wellhead platform systems, and more particularly, to apparatuses, systems, computing devices, and methods for use in wellhead platform systems to perform, among other things, extracting and testing of raw multi-phase mixtures.

In general, wellhead platform systems are employed to perform extracting and testing of naturally occurring raw mixtures, including hydrocarbons and other chemicals in solid, liquid, and/or gas form (hereinafter "raw mixture", "multi-phase raw mixture", or "input raw mixture"), from underground reservoirs (such as subsea reservoirs, etc.). Wellhead platform systems typically comprise a wellhead platform having a plurality of complex systems, subsystems, and components installed on the wellhead platform. Wellhead platforms are generally pre-constructed either in whole or in portions on dry land, towed to the destination where the reservoirs are located, and assembled and permanently anchored to the surface (such as an ocean floor) above the reservoir. Due to finite available/useable space on wellhead platforms, the use of such space on wellhead platforms must be appropriately calculated and planned for the entire extracting lifecycle of the reservoir.

BRIEF SUMMARY

It is recognized in the present disclosure that, during the lifecycle of extracting raw mixtures from a given reservoir, the reservoir will inherently discharge raw mixtures with gradually decreasing flowing pressure. A point will be reached in a lifecycle of the reservoir when the flowing pressure of the reservoir becomes too low for a conventional booster compressor subsystem to assist in extracting the raw mixtures that still remain in the reservoirs. At such a point, the liquid content in the extracted raw mixtures will generally be too high as compared to the gas content, and such excess liquid content will effectively block the raw mixture from flowing to the wellhead platform system. An unloading operation, which attempts to remove the excess liquid from the well tubing that may be blocking the raw mixture from flowing to the wellhead platform system, may be employed to assist in performing a final extraction process of raw mixtures from such reservoirs. However, despite performing an unloading operation, such late-stage reservoirs continue to contain valuable raw mixtures. The present disclosure recognizes a need to continue extracting such remaining valuable raw mixtures.

It is also recognized in the present disclosure that several problems, including redundancies and valuable space consumption, exist in wellhead platform systems. For example, a wellhead platform system may occupy a large footprint on the wellhead platform. In particular, subsystems of a wellhead platform system, including a test separator subsystem, booster compressor subsystem, closed drain subsystem, and instrument gas and utility gas subsystems, will each require its own footprint on the wellhead platform. The present disclosure recognizes a need to improve or reduce such limited space consumption and components/subsystems on wellhead platforms.

Present example embodiments relate generally to wellhead platforms systems, and in particular, apparatuses, systems, computing devices, and methods for use in wellhead platform systems to extract and measure raw mixtures via a plurality of wellheads and provide same to one or more export lines. Present example embodiments enable the extraction lifecycle of a reservoir to be extended by enabling continued extraction of raw mixtures during late stages of extraction, including stages wherein the wellhead flowing pressure (WHFP) is below about 10 barg, and in particular, when the WHFP is below about 3 to 5 barg. Present example embodiments are also directed to improved wellhead platform systems operable to reduce the required footprint and components/subsystems of the system on wellhead platforms.

In an exemplary embodiment, a system is described. The system may be for use in a wellhead platform to extract multi-phase raw mixtures via a plurality of wellheads and provide same to an export line. The system may comprise a controller, a separator subsystem, a scrubber subsystem, a first stage compressor subsystem, and a second stage compressor subsystem. The controller may be operable to dynamically configure the system to be in one of a well testing mode, a low pressure mode, or an unloading mode based on at least a received wellhead flowing pressure (WHFP) measurement. The well testing mode may be configured when the WHFP is between about 3 to 60 barg. The low pressure mode may be configured when the WHFP is between about 3 to 20 barg. The unloading mode may be configured when the WHFP is equal to or less than about 3 to 5 barg. The separator subsystem may comprise a separator assembly and a separator blowcase assembly. The separator assembly may comprise a separator inlet section for receiving the extracted multi-phase raw mixtures, a separator container body for housing the received multi-phase raw mixture, a separator gas outlet section for separating gas, and a separator liquid outlet section for separating liquid. The separator gas outlet section may be configurable by the controller to provide gas directly to the export line when in the well testing mode. The separator blowcase assembly may comprise a separator blowcase container body, a separator blowcase liquid inlet section connected to the separator liquid outlet section for receiving liquid into the separator blowcase container body, a separator blowcase liquid outlet section, and a separator blowcase gas inlet section. The scrubber subsystem may comprise a scrubber assembly and a scrubber blowcase assembly. The scrubber assembly may comprise a scrubber inlet section, a scrubber container body, a scrubber gas outlet section for separating gas, and a scrubber liquid outlet section for separating liquid. The scrubber inlet section may be configurable by the controller to receive gas directly from the separator gas outlet section when in the low pressure mode. The scrubber inlet section may be configurable by the controller to receive gas directly from the export line when in the unloading mode. The scrubber blowcase assembly may comprise a scrubber blowcase container body, a scrubber blowcase liquid inlet section connected to the scrubber liquid outlet section for receiving liquid into the scrubber blowcase container body, a scrubber blowcase liquid outlet section, and a scrubber blowcase gas inlet section. The first stage compressor subsystem may comprise a first stage compressor gas inlet section, a first stage compressor for compressing gas, and a first stage compressor gas outlet section. The first stage compressor gas inlet section may be configurable to receive gas from the scrubber gas outlet section. The first stage compressor may be configurable to compress the received gas. The first stage compressor gas outlet section may be configurable to output the compressed gas when in the low pressure mode or the unloading mode. The second stage compressor subsystem may comprise a second stage compressor gas inlet section, a second stage compressor, and a second stage compressor gas outlet section. The second stage compressor gas inlet section may be configurable to receive gas from the first stage compressor outlet section. The second stage compressor may be configurable to further compress the received compressed gas. The second stage compressor gas outlet section may be configurable to output the further compressed gas to the separator blowcase gas inlet section and the scrubber blowcase gas inlet section when in the low pressure mode or the unloading mode.

In another exemplary embodiment, a system is described. The system may be for use in a wellhead platform to extract multi-phase raw mixtures via a plurality of wellheads and provide same to an export line. The system may comprise a separator subsystem, a scrubber subsystem, a first stage compressor subsystem, a second stage compressor subsystem, and a controller. The separator subsystem may comprise a separator assembly and a separator blowcase assembly. The separator assembly may comprise a separator inlet section for receiving multi-phase raw mixtures extracted via the wellheads, a separator container body for housing the received multi-phase raw mixture, a separator gas outlet section for separating gas, and a separator liquid outlet section for separating liquid. The separator blowcase assembly may be operable to receive liquid separated from the separator assembly. The separator blowcase assembly may comprise a separator blowcase container body, a separator blowcase liquid inlet section for receiving liquid from the separator liquid outlet section into the separator blowcase container body, a separator blowcase liquid outlet section, and a separator blowcase gas inlet section operable to receive gas into the separator blowcase container body to push liquid housed in the separator blowcase container body through the separator blowcase liquid outlet section. The scrubber subsystem may comprise a scrubber assembly and a scrubber blowcase assembly. The scrubber assembly may comprise a scrubber inlet section connected to the separator gas outlet section, a scrubber container body, a scrubber gas outlet section for separating gas, and a scrubber liquid outlet section for separating liquid. The scrubber blowcase assembly may be operable to receive liquid separated from the scrubber assembly. The scrubber blowcase assembly may comprise a scrubber blowcase container body, a scrubber blowcase liquid inlet section for receiving liquid from the scrubber liquid outlet section into the scrubber blowcase container body, a scrubber blowcase liquid outlet section, and a scrubber blowcase gas inlet section operable to receive gas into the scrubber blowcase container body to push liquid housed in the scrubber blowcase container body through the scrubber blowcase liquid outlet section. The first stage compressor subsystem may be operable to receive gas separated from the scrubber assembly, compressing the received gas, and outputting the compressed gas. The second stage compressor subsystem may be operable to receive compressed gas from the first stage compressor subsystem, further compressing the received compressed gas, and outputting the further compressed gas. The controller may be operable to dynamically configure the system to be in one of a well testing mode, a low pressure mode, or an unloading mode. The controller may be operable to configure the separator subsystem to provide gas separated via the separator gas outlet section directly to the export line and bypass the scrubber inlet section when the system is configured in the well testing mode. The controller may also be operable to configure the separator subsystem to provide gas separated via the separator gas outlet section to the scrubber inlet section and configure the second stage compressor subsystem to selectively provide gas to the separator blowcase gas inlet section and the scrubber blowcase gas inlet section when the system is configured in the low pressure mode. The controller may also be operable to configure the scrubber inlet section to receive gas from the export line and configure the second stage compressor subsystem to provide gas to the separator blowcase gas inlet section and the scrubber blowcase gas inlet section when the system is configured in the unloading mode. The controller may be operable to dynamically configure the system to be in the well testing mode when a wellhead flowing pressure (WHFP) is determined by the controller to be between about 3 to 60 barg. The controller may be operable to dynamically configure the system to be in the low pressure mode when the WHFP is determined by the controller to be between about 3 to 20 barg. The controller may be operable to dynamically configure the system to be in the unloading mode when the WHFP is determined by the controller to be equal to or less than about 3 to 5 barg.

In another exemplary embodiment, a system is described. The system may be for use in a wellhead platform to extract multi-phase raw mixtures via a plurality of wellheads and provide same to an export line. The system may comprise a separator subsystem, a scrubber subsystem, a first stage compressor subsystem, and a second stage compressor subsystem. The separator subsystem may comprise a separator inlet section for receiving multi-phase raw mixtures extracted via the wellheads, a separator container body for housing the received multi-phase raw mixture, and a separator gas outlet section for separating gas. The scrubber subsystem may comprise a scrubber inlet section connected to the separator gas outlet section, a scrubber container body, and a scrubber gas outlet section for separating gas. The first stage compressor subsystem may be operable to receive gas separated from the scrubber subsystem, compress the received gas, and output the compressed gas. The second stage compressor subsystem may be operable to receive compressed gas from the first stage compressor subsystem, further compress the received compressed gas, and output the further compressed gas.

In another exemplary embodiment, a system is described. The system may be for use in a wellhead platform to extract multi-phase raw mixtures via a plurality of wellheads and provide same to an export line. The system may comprise a separator subsystem, a first stage compressor subsystem, and a second stage compressor subsystem. The separator subsystem may comprise a separator assembly and a blowcase assembly. The separator assembly may comprise a separator inlet section for receiving multi-phase raw mixtures extracted via the wellheads, a separator container body for housing the received multi-phase raw mixture, a separator gas outlet section for separating gas, and a separator liquid outlet section for separating liquid. The blowcase assembly may be operable to receive liquid separated from the separator assembly. The blowcase assembly may comprise a blowcase container body, a blowcase liquid inlet section for receiving liquid from the separator liquid outlet section into the blowcase container body, a blowcase liquid outlet section, and a blowcase gas inlet section operable to receive gas into the blowcase container body to push liquid housed in the blowcase container body through the blowcase liquid outlet section. The first stage compressor subsystem may be operable to receive gas separated from the separator assembly, compress the received gas, and output the compressed gas. The second stage compressor subsystem may be operable to receive compressed gas from the first stage compressor subsystem, further compress the received compressed gas, and output the further compressed gas.

In another exemplary embodiment, a controller is described. The controller may be for use in operating a wellhead platform system. The wellhead platform system may comprise a separator subsystem, a scrubber subsystem, a first stage compressor subsystem, and a second stage compressor subsystem. The separator subsystem may comprise a separator inlet section for receiving multi-phase raw mixtures extracted via wellheads, a separator container body for housing the received multi-phase raw mixture, and a separator gas outlet section for separating gas. The scrubber subsystem may comprise a scrubber inlet section connected to the separator gas outlet section, a scrubber container body, and a scrubber gas outlet section for separating gas. The first stage compressor subsystem may be operable to receive gas separated from the scrubber subsystem, compress the received gas, and output the compressed gas. The second stage compressor subsystem may be operable to receive compressed gas from the first stage compressor subsystem, further compress the received compressed gas, and output the further compressed gas. The controller may be operable to dynamically configure the wellhead platform system to be in one of a well testing mode, a low pressure mode, or an unloading mode. The controller may also be operable to configure the separator subsystem to provide gas separated via the separator gas outlet section directly to the export line and bypass the scrubber inlet section when the wellhead platform system is configured in the well testing mode. The controller may also be operable to configure the separator subsystem to provide gas separated via the separator gas outlet section to the scrubber inlet section and not fed directly to the export line when the wellhead platform system is configured in the low pressure mode. The controller may also be operable to configure the scrubber inlet section to receive gas from the export line when the wellhead platform system is configured in the unloading mode. The controller may be operable to dynamically configure the wellhead platform system to be in the well testing mode when a wellhead flowing pressure (WHFP) is determined by the controller to be between about 3 to 60 barg. The controller may be operable to dynamically configure the wellhead platform system to be in the low pressure mode when the WHFP is determined by the controller to be between about 3 to 20 barg. The controller may be operable to dynamically configure the wellhead platform system to be in the unloading mode when the WHFP is determined by the controller to be equal to or less than about 3 to 5 barg.

In another exemplary embodiment, a method is described. The method may be for use in operating a wellhead platform system to extract multi-phase raw mixtures via a plurality of wellheads and provide same to an export line. The wellhead system may comprise a separator subsystem, scrubber subsystem, first stage compressor subsystem, and second stage compressor subsystem. The separator subsystem may comprise a separator assembly and a separator blowcase assembly. The scrubber subsystem may comprise a scrubber assembly and a scrubber blowcase assembly. The method may comprise measuring, using at least one or more flow meters, a wellhead flowing pressure (WHFP). When the WHFP is greater than or equal to a testing threshold value, the method may further comprise performing a well testing operation. The well testing operation may comprise receiving, at the separator subsystem, multi-phase raw mixtures extracted via the wellheads. The well testing operation may further comprise separating, at the separator subsystem, gas and liquid from the received multi-phase raw mixture. The well testing operation may further comprise providing the separated gas directly to the export line and bypassing the scrubber subsystem. The well testing operation may further comprise providing the separated liquid directly to the separator blowcase assembly. When the WHFP is between a first threshold value and a second threshold value, the method may further comprise performing a boosting operation. The boosting operation may comprise receiving, at the separator subsystem, multi-phase raw mixtures extracted via the wellheads. The boosting operation may further comprise separating, from the separator subsystem, gas and liquid from the received multi-phase raw mixture. The boosting operation may further comprise receiving, at a cooler subsystem, the separated gas. The boosting operation may further comprise receiving, at the separator blowcase assembly, the separated liquid. The boosting operation may further comprise cooling, at the cooler subsystem, the separated gas to condense liquid in the separated gas. The boosting operation may further comprise receiving, at the scrubber subsystem, the cooled gas and liquid mixture. The boosting operation may further comprise further separating, from the scrubber system, gas and liquid from the received cooled gas and liquid mixture. The boosting operation may further comprise receiving, at the scrubber blowcase assembly, the separated liquid. The boosting operation may further comprise receiving, at the first stage compressor subsystem, the further separated gas. The boosting operation may further comprise compressing, at the first stage compressor subsystem, the further separated gas. The boosting operation may further comprise receiving, at the second stage compressor subsystem, the compressed gas. The boosting operation may further comprise further compressing, at the second stage compressor subsystem, the further compressed gas. The boosting operation may further comprise providing, to the separator blowcase assembly and the scrubber blowcase assembly, the further compressed gas to discharge the received liquid in the separator blowcase assembly and the scrubber blowcase assembly, respectively. When the WHFP is equal to or less than the second threshold value, the method may further comprise performing an unloading operation. The unloading operation may comprise receiving, at the cooler assembly from the export line, high pressured gas. The unloading operation may further comprise cooling, at the cooler subsystem, the high pressured gas to condense liquid in the high pressured gas. The unloading operation may further comprise receiving, at the scrubber subsystem, the cooled gas and liquid mixture. The unloading operation may further comprise separating, at the scrubber system, gas and liquid from the received cooled gas and liquid mixture. The unloading operation may further comprise receiving, at the first stage compressor subsystem, the separated gas. The unloading operation may further comprise compressing, at the first stage compressor subsystem, the separated gas. The unloading operation may further comprise receiving, at the second stage compressor subsystem, the compressed gas. The unloading operation may further comprise further compressing, at the second stage compressor subsystem, the further compressed gas. The unloading operation may further comprise providing, to the separator blowcase assembly and the scrubber blowcase assembly, the further compressed gas to discharge the received liquid in the separator blowcase assembly and the scrubber blowcase assembly, respectively.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and.

Although similar reference numbers may be used to refer to similar elements in the figures for convenience, it can be appreciated that each of the various example embodiments may be considered to be distinct variations.

Example embodiments will now be described with reference to the accompanying drawings, which form a part of the present disclosure and which illustrate example embodiments which may be practiced. As used in the present disclosure and the appended claims, the terms "example embodiment", "exemplary embodiment", and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on", and the terms "a", "an", and "the" may include singular and plural references. Furthermore, as used in the present disclosure and the appended claims, the term "by" may also mean "from", depending on the context. Furthermore, as used in the present disclosure and the appended claims, the term "if" may also mean "when" or "upon", depending on the context. Furthermore, as used in the present disclosure and the appended claims, the words "and/or" may refer to and encompass any and all possible combinations of one or more of the associated listed items.

DETAILED DESCRIPTION

Figure 1:
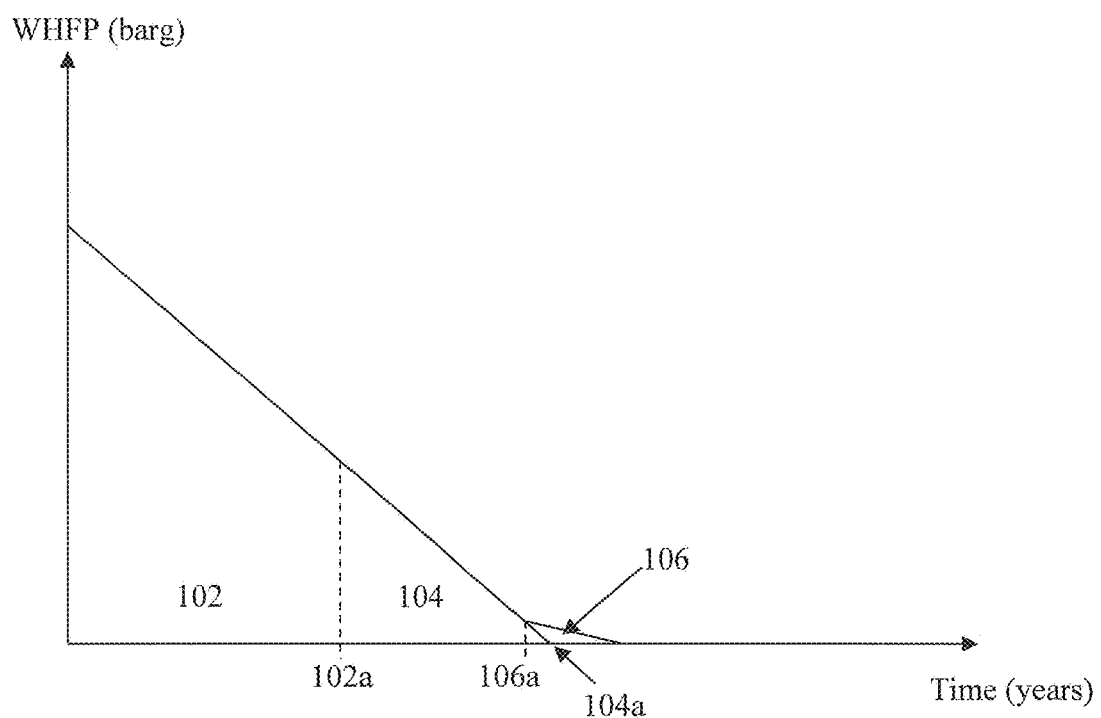
FIG. 1 is an example relationship of a wellhead flowing pressure (WHFP) of a reservoir over a lifecycle of the reservoir for a wellhead platform system.

FIG. 1 illustrates an example relationship of a wellhead flowing pressure (WHFP) of a reservoir over an extraction lifecycle of the reservoir. As shown in FIG. 1, during early and mid stages of extracting raw mixtures, as shown in region 102, a reservoir will inherently discharge raw mixtures with relatively high flowing pressures. The extracting of raw mixtures during such stages may be performed via the naturally occurring high flowing pressures inherent in the reservoirs.

During the lifecycle of the reservoir, the reservoir will inherently discharge raw mixtures with a gradually decreasing flowing pressure. Eventually, the WHFP will decrease to a first threshold 102a of about 20 barg or less, which is a point where the natural flowing pressure of the reservoir is insufficient or unsatisfactory to extract the raw mixtures from the reservoir. At this point, a conventional booster compressor may be employed to continue extracting raw mixtures, as shown in region 104. Eventually, the WHFP will decrease to a second threshold 104a of below 10 barg, which is a point where a conventional booster compressor will be insufficient to continue assisting with the extracting of raw mixtures. At some time 106a prior to, at, or after this second threshold 104a, such as when the WHFP is about 10 to 12 barg, an unloading process may be performed, which is effectively a final attempt to extract a small amount of raw mixtures by removing excess liquid from the well tubing of the wellhead platform system that may be blocking some raw mixture from flowing to the wellhead platform system, as shown in region 106.

An example wellhead platform system for performing the aforementioned extracting of naturally occurring raw mixtures from reservoirs may comprise a wellhead platform having a plurality of complex systems, subsystems, and components installed on the wellhead platform. Wellhead platforms may be pre-constructed either in whole or in portions on dry land, towed to the destination where the underground reservoirs are located, and assembled/installed and permanently anchored to a surface above the reservoir. Systems, subsystems, and components of the wellhead platform system may include one or more export lines for transferring extracted raw mixtures to other platforms or facilities; a three phase test separator subsystem for measuring production parameters and performing the aforementioned unloading operations (such as region 106); a booster compressor subsystem for assisting in extracting raw mixtures during low flowing pressure stages (such as region 104); a closed drain subsystem for receiving liquids separated in the wellhead platform system; an instrument gas and utility gas (IG/UG) subsystems for providing clean gas (via the instrument gas subsystem) and less clean gas (via the utility gas subsystem) to enable valves, pumps, etc. to function during the lifecycle of the extracting process; valves, instruments, sensors, pumps, motors/engines, interconnections (such as pipes, and the like) between components, subsystems, and systems, etc.

Figure 2:
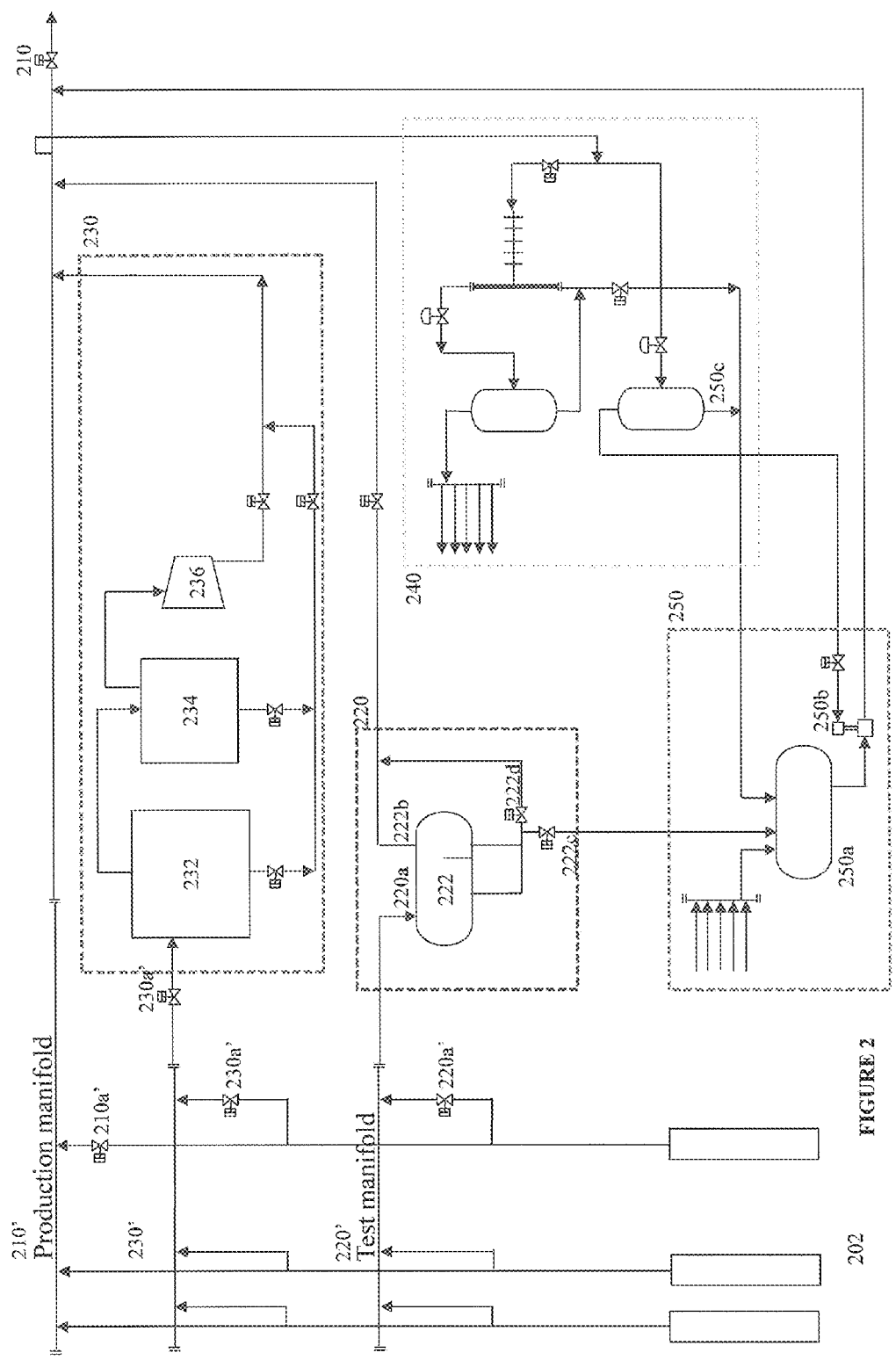
FIG. 2 is an example functional diagram of a wellhead platform system.
Figure 3:
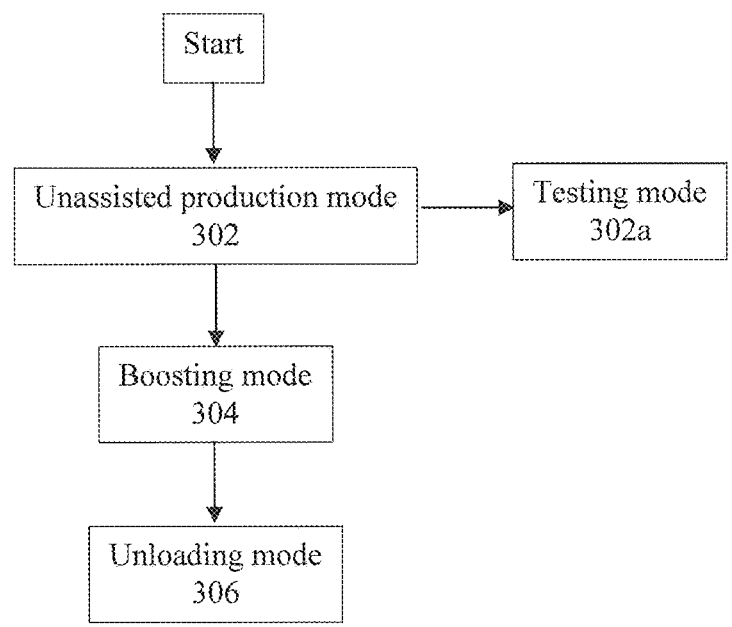
FIG. 3 is an example illustration of the modes of operation of the wellhead platform system of FIG. 2.

FIG. 2 illustrates an example functional diagram of a wellhead platform system 200 according to FIG. 1 that may operate in one of four general modes, namely, an unassisted production mode (during early and mid stages of extraction), testing mode (also during early and mid stages of production), boosting mode (during the late stage of extraction), and unloading mode (during the final stage of extraction). These four modes of operation are summarized in FIG. 3.

During early and mid stages 102 (e.g., the unassisted production mode 302) of raw mixture extraction when a reservoir inherently possesses sufficiently high flowing pressure (such as when the WHFP is between about 20 to 60 barg), the extraction of raw mixtures via wellheads 202 may be performed by actuating appropriate valve(s) so as to enable raw mixtures to traverse to the export line 210 via the production manifold 210'. For example, one or more valves, such as valve 210a', may be actuated to be in the opened position and one or more valves, such as valves 220a' and 230a', may be actuated to be in the closed position.

During the extraction of raw mixtures, it is often desired and/or required to perform intermittent, periodic, and/or continuous testing and measuring of production parameters of extracted raw mixtures 102 (e.g., testing mode 302a). A testing mode 302a may be performed for such a purpose by actuating appropriate valves to enable raw mixtures to traverse to the test separator subsystem 220 via the test manifold 220' when the reservoir has sufficiently high flowing pressure (such as when the WHFP is between about 20 to 60 barg). For example, one or more valves, such as valve 220a', may be actuated to be in the opened position and one or more valves, such as valves 210a' and 230a', may be actuated to be in the closed position.

An example of the test separator subsystem 220 may comprise a three phase test separator 222 (operable to separate liquid, gas, and condensate) having an input 222a connected to the test manifold 220', a gas output 222b connected to the export line 210, and a liquid output 222d connected to the export line 210. An example of the test separator 222 may be operable to perform a separation process of the raw mixtures received via the test manifold 220' to separate gas components from the raw mixture to the gas output 222b and liquid components from the raw mixture to the liquid output 222d. Liquid may also be separated to the closed drain subsystem 250 via liquid output 222c. Instrument sensors of the test separator subsystem 220 may be employed to measure and test such separated components of the input raw mixture.

During the late stages 104 (e.g., the boosting mode 304) of raw mixture extraction when a reservoir inherently possesses insufficient or unsatisfactory flowing pressure (such as when the WHFP is between about 10 to 20 barg), as depicted by 102a, extraction of raw mixtures via wellheads 202 may be performed by actuating appropriate valve(s) so as to enable raw mixtures to traverse to the booster compressor subsystem 230 via the booster compressor manifold 230'. For example, one or more valves, such as valve 230a', may be actuated to be in the opened position and one or more valves, such as valves 210a' and 220a', may be actuated to be in the closed position.

An example of the booster compressor subsystem 230 may comprise a booster compressor separator 232 connected to the booster compressor manifold 230', a booster compressor scrubber 234 connected to the booster compressor separator 232, and a conventional single stage booster compressor 236 connected to the booster compressor scrubber 234. An example of the booster compressor separator 232 and booster compressor scrubber 234 may each be operable to perform a separation process of the raw mixtures received via the booster compressor manifold 230' to separate gas and liquid components from the raw mixture. An example of the single stage booster compressor 236 may then be operable to perform a boosting or compressing process to assist in increasing the flowing pressure and extracting of raw mixtures from the reservoir.

During very late stages 106 (e.g., the unloading mode 306) of raw mixture extraction when the flowing pressure of the reservoir becomes too low (such as when the WHFP is lower than about 10 barg), as depicted as 104a, a booster compressor subsystem 230 will generally not be able to assist in extracting raw mixtures from the reservoir. Put differently, when the WHFP of the reservoir becomes too low, the liquid content in the extracted raw mixtures will generally be too high as compared to the gas content, and therefore the booster compressor subsystem 230 will not be able to assist in increasing the flowing pressure to extract more raw mixtures from the reservoir. In such very late stages, an unloading mode 306 may be performed before (such as point 106a), at, or after the point wherein the booster compressor subsystem 230 is unable to further assist by using the test separator subsystem 220, the closed drain subsystem 250, and the instrument gas/utility gas subsystem ("IG/UG subsystem) 240. The unloading mode 306 effectively attempts to remove excess liquid from the well tubing that may be blocking the raw mixture from flowing to the wellhead platform system. The unloading mode 306 may be performed by actuating appropriate valve(s) so as to enable raw mixtures to traverse through the test separator subsystem 220 via the test separator manifold 220' and the closed drain subsystem 250 to the export line 210. For example, one or more valves, such as valve 220a', may be actuated to be in the opened position and one or more valves, such as valves 210a' and 230a', may be actuated to be in the closed position.

In the unloading mode 306 (very low flowing pressure 106), liquid to be separated from the test separator liquid output 222d is generally unable to flow to the export line 210 due to insufficient flowing pressures and/or hydrostatic forces of the liquids in the test separator 222 (i.e., in situations wherein the liquids in the test separator 222 are unable to naturally flow to the export line 210 by itself). To encourage such liquid in the test separator 222 to flow through the liquid output 222c, the closed drain subsystem 250 may comprise a closed drain vessel 250a connected to the test separator liquid output 222c and a closed drain pump 250b for pumping the liquid from the closed drain vessel 250a to the export line 210. The closed drain pump 250b may be operable to perform the pumping action by receiving driven gas from the utility gas subsystem of the IG/UG subsystem 240. The IG/UG subsystem 240 is operable to receive the high pressured gas from the export line 210, perform cleaning of the received high pressured gas by passing it through a knock-out drum assembly 250c, and provide the cleaned high pressured gas to operate the closed drain pump 250b.

It is recognized in the present disclosure that, during the lifecycle of extracting raw mixtures from a given reservoir, the reservoir will inherently discharge raw mixtures with gradually decreasing flowing pressure. When the flowing pressure of the reservoir becomes too low for the aforementioned conventional single stage booster compressor subsystem 230 to assist in extracting the raw mixtures that still remain in the reservoirs, the aforementioned unloading operation 306 using the test separator subsystem 220, the closed drain subsystem 250, and the instrument gas/utility gas subsystem ("IG/UG subsystem) 240 may be employed to assist in performing a final extraction of some raw mixtures from such reservoirs. However, it is recognized in the present disclosure that, despite performing the aforementioned unloading operation 306, such late-stage reservoirs continue to contain valuable raw mixtures.

It is also recognized in the present disclosure that wellhead platform system 200, including the test separator subsystem 220, booster compressor subsystem 230, closed drain subsystem 250, and instrument gas/utility gas subsystem 240, may be improved so as to reduce space consumption and components of the wellhead platform system 200.

Figure 4:
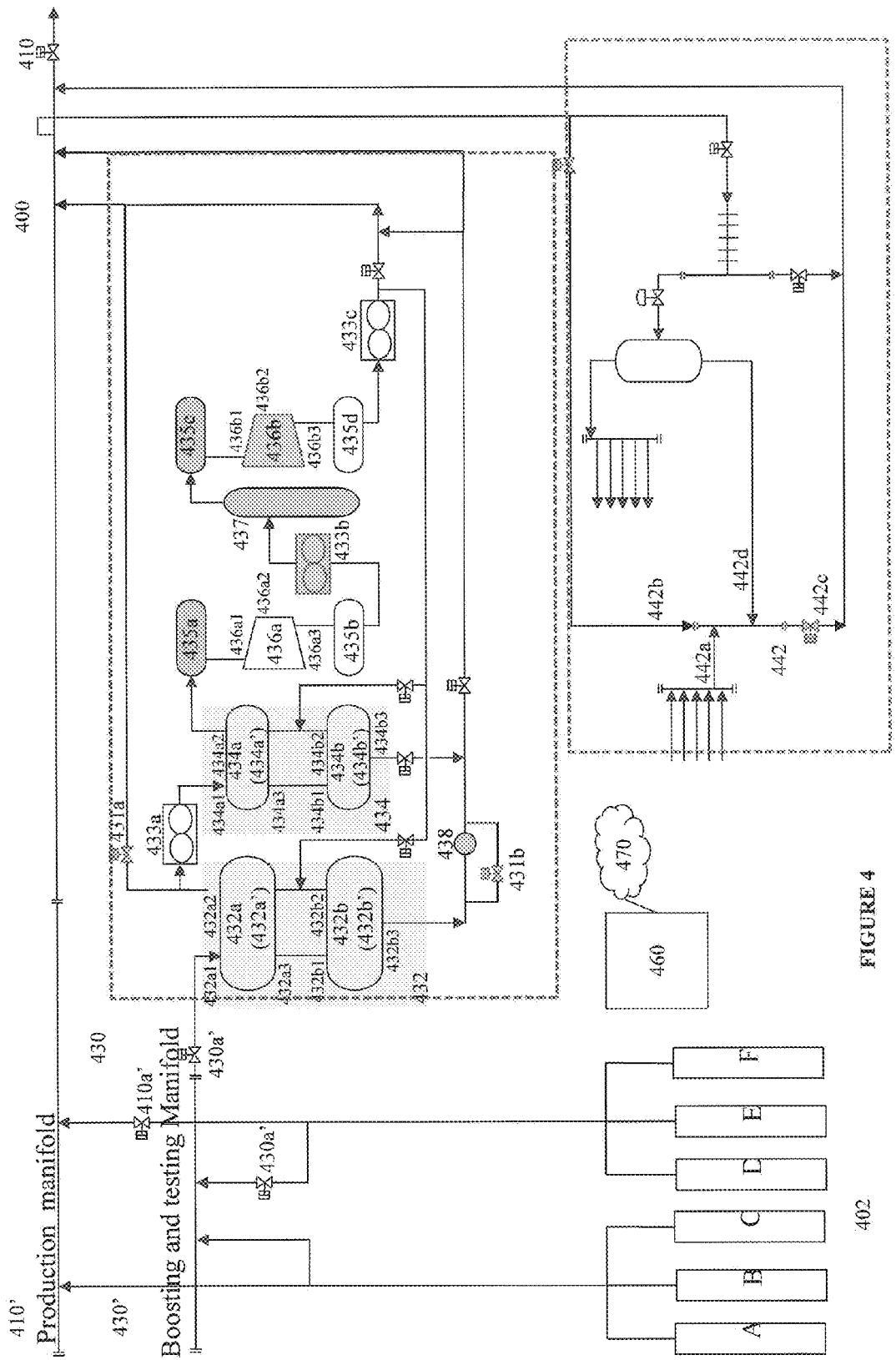
FIG. 4 is an example functional diagram of an example embodiment of a wellhead platform system.
Figure 5:
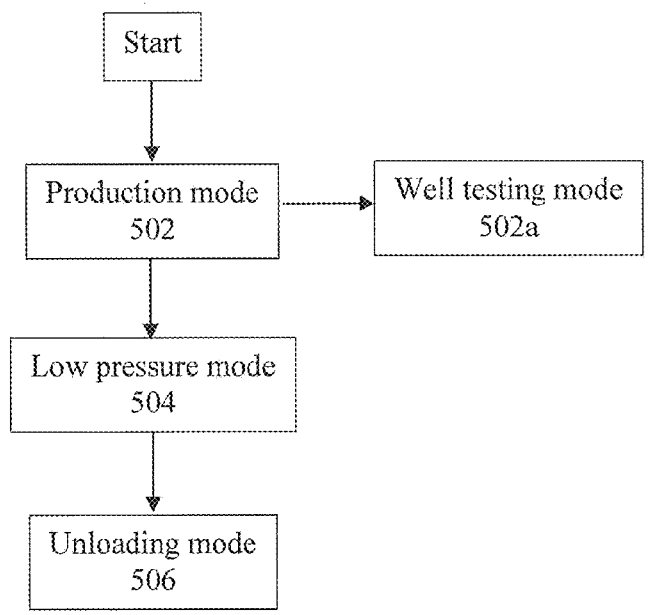
FIG. 5 is an example illustration of the modes of operation of an example embodiment of the wellhead platform system illustrated in FIG. 4.
Figure 6:
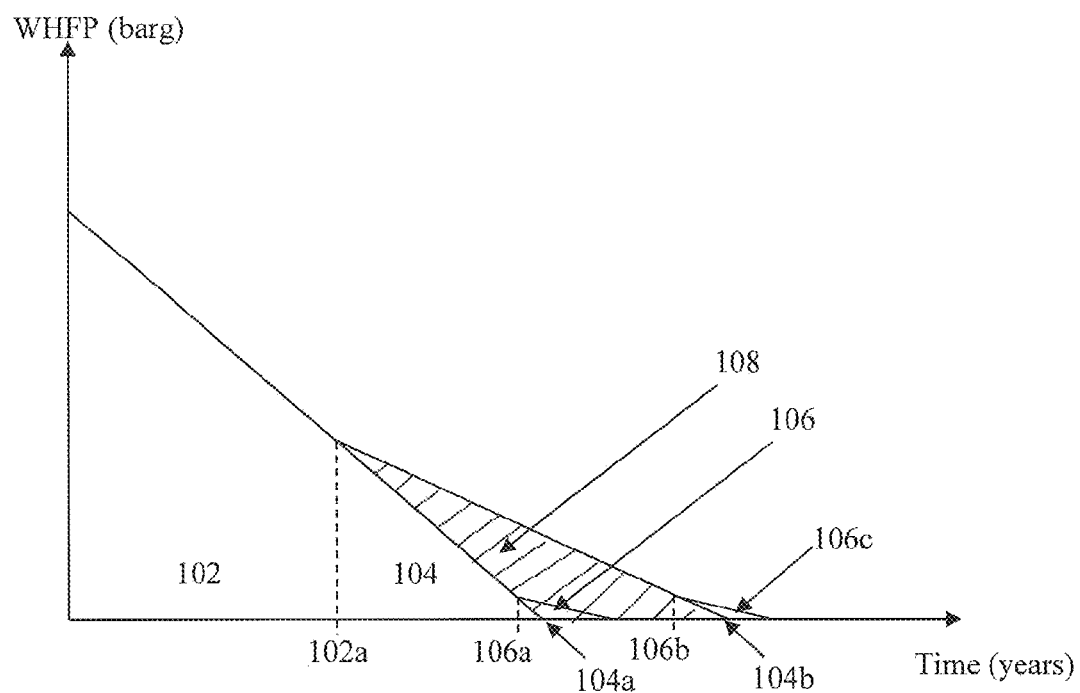
FIG. 6 is an example comparison of the lifecycle of extracting multi-phase raw mixtures using the wellhead platform system of FIG. 2 as compared to an example embodiment of the wellhead platform system illustrated in FIG. 4.
Figure 7A:
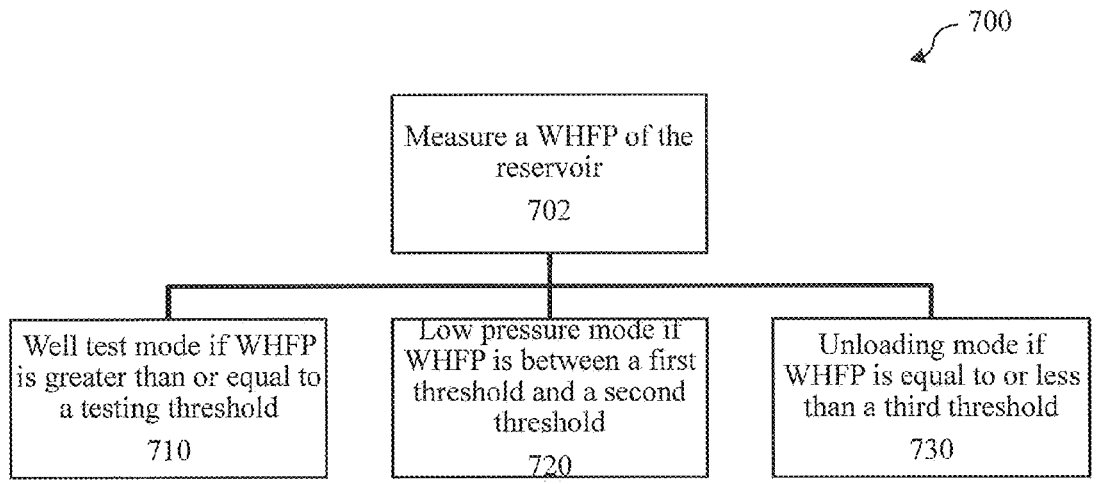
FIG. 7A is an example embodiment of a method of operating a wellhead platform system.
Figure 7B:
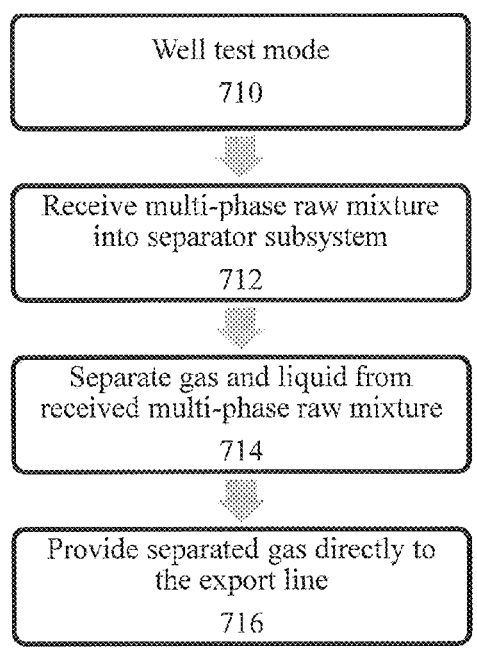
FIG. 7B is an example embodiment of a method of operating a wellhead platform in a well testing mode.
Figure 7C:
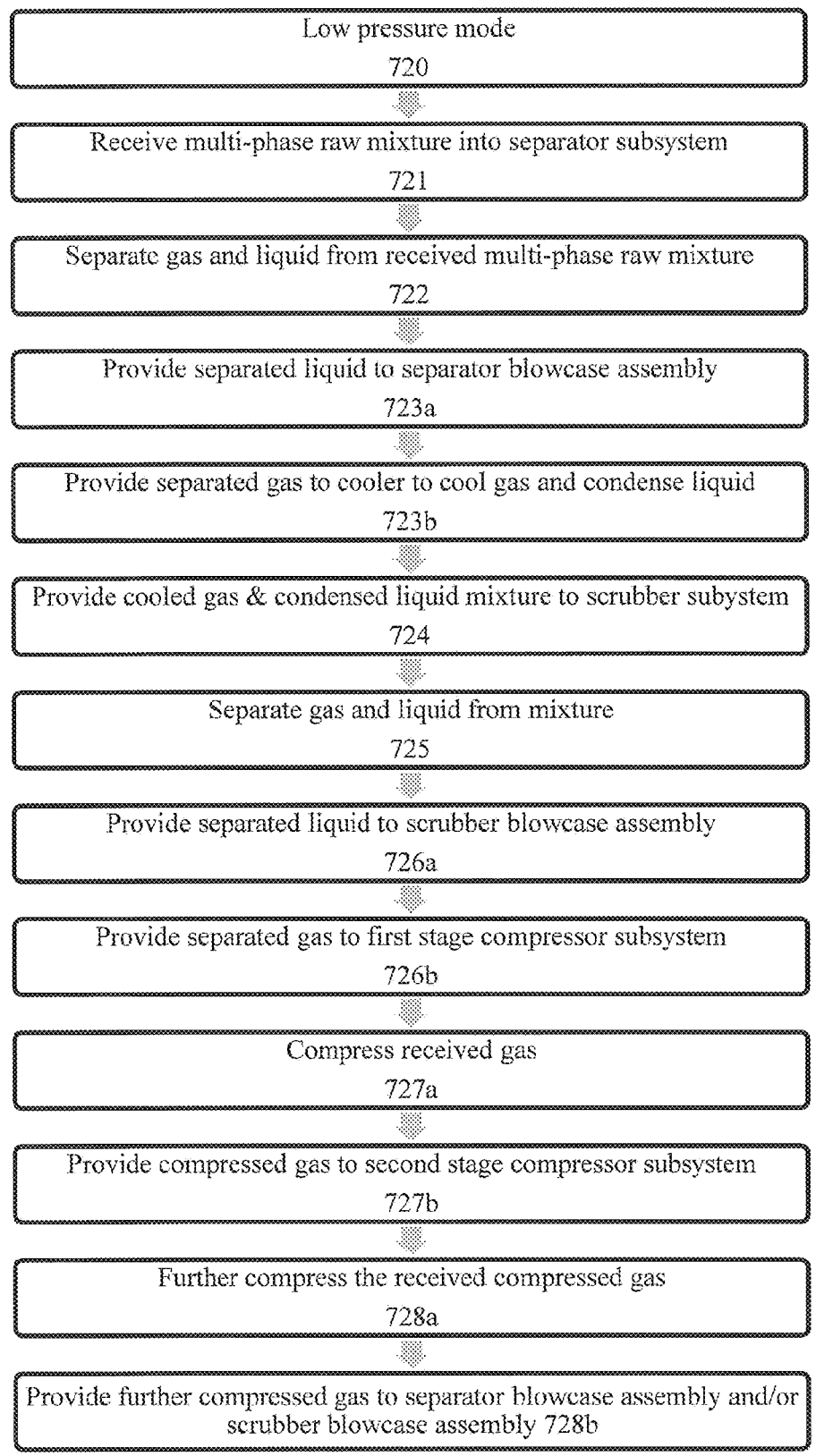
FIG. 7C is an example embodiment of a method of operating a wellhead platform in a low pressure mode.
Figure 7D:
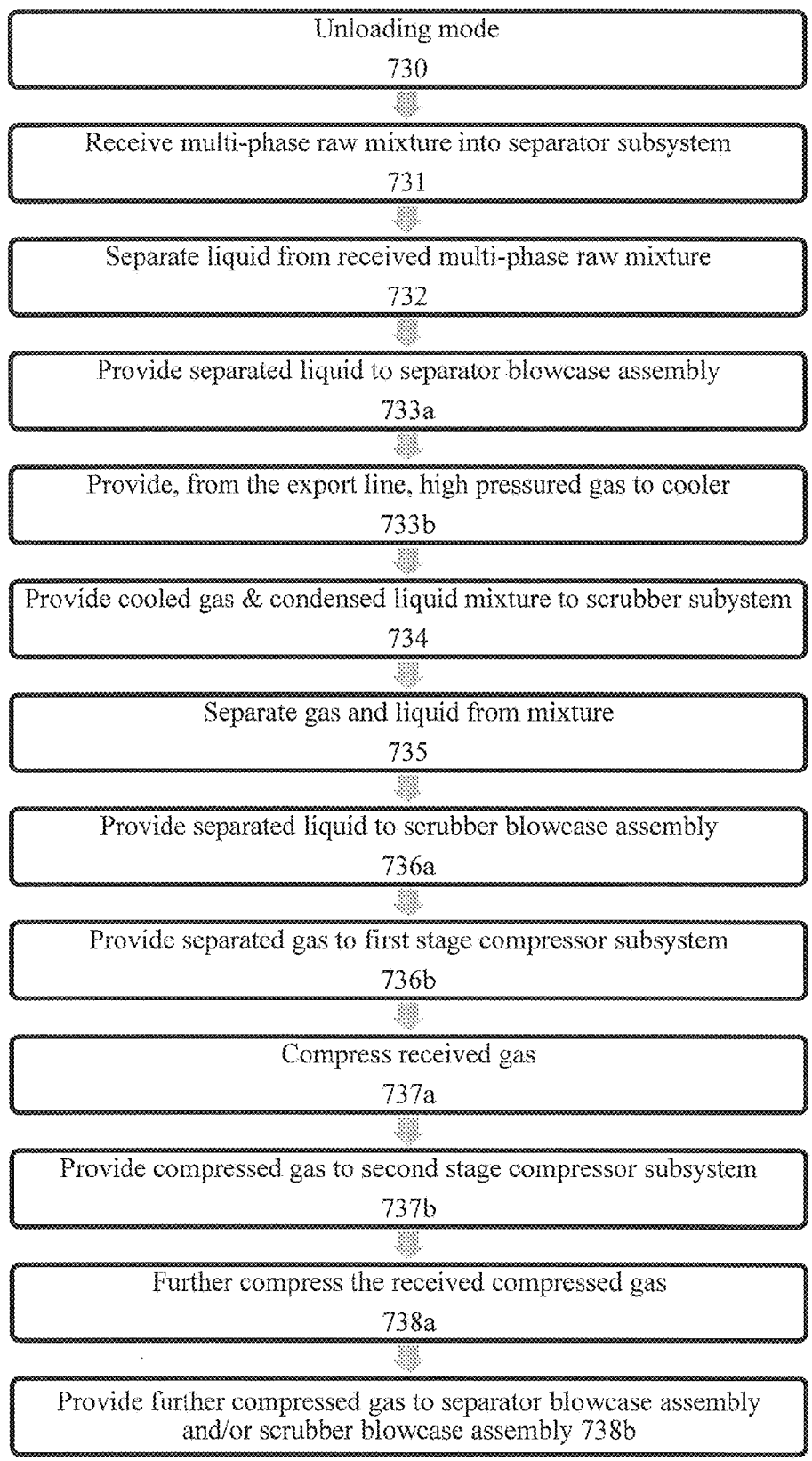
FIG. 7D is an example embodiment of a method of operating a wellhead platform in an unloading mode.

FIG. 4 illustrates an example embodiment of a wellhead platform system 400 for use in extracting raw mixtures and extending the lifecycle of an extracting process. The wellhead platform system 400 may operate in one of several modes, including a production mode, well testing mode, low pressure mode, and unloading mode. These modes of operation are summarized in FIG. 5. An example embodiment of the wellhead platform system 400 enables the extending of the lifecycle of the extracting process so as to enable more valuable raw mixtures to be extracted from the reservoir, as compared to the wellhead platform system 200 and conventional wellhead platform systems. For example, FIG. 6 illustrates a comparison of the lifecycle of the extracting process for the wellhead platform system 200 (which is depicted in FIG. 2) as compared to example embodiments of the wellhead platform system 400 (which is superimposed over the graph depicted in FIG. 1), and the shaded region 108 of FIG. 6 illustrates the increase in extracting time and extracted valuable raw mixtures achievable by using example embodiments of the wellhead platform system 400. As shown in FIG. 6, during early and mid stages 102 (e.g., the production mode 502) of raw mixture extraction when a reservoir inherently possesses sufficiently high flowing pressure (such as when the WHFP is between about 20 to 60 barg), the extraction of raw mixtures via wellheads 202 may be performed using the naturally occurring high flowing pressures inherent in the reservoirs. As illustrated in FIG. 6, the late stages of raw mixture extraction, which may commence at about point 102*a* when a reservoir inherently possesses insufficient or unsatisfactory flowing pressure (such as when the WHFP is between about 5 to 20 barg), may be extended by operating example embodiments of the wellhead platform system 400 in the low pressure mode 504. In doing so, it is recognized in the present disclosure that the wellhead platform system 400 may continue raw mixture extraction in the low pressure mode 504 until about a point 104*b* (such as until the WHFP is about 3 to 5 barg), which is recognized in the present disclosure to be a substantively longer time (and correspondingly, substantively more extraction of raw mixtures) than those available from the wellhead platform system 200 and conventional wellhead platform systems. During very late stages 106*c* (e.g., the unloading mode 506) of raw mixture extraction using the wellhead platform system 400 when the flowing pressure of the reservoir becomes too low (such as when the WHFP is equal to or less than about 3 to 5 barg), as depicted as 104*b*, the wellhead platform system 400 may continue extracting of raw mixtures in the unloading mode 506. The unloading mode 506 may commence before (such as point 106*b*), at, or after the point 104*b*.

As illustrated in FIG. 4, the wellhead platform system 400 also enables a reduction of space consumption and components, as compared to the wellhead platform system 200 and conventional wellhead platform systems, by eliminating at least the test separator subsystem 220 (see FIG. 2), the test separator manifold 220' (see FIG. 2), the closed drain subsystem 250 (see FIG. 2), and associated components, including pumps (such as the closed drain pump 250*b*), valves (such as the valves 220*a*'), etc.

Example embodiments of the wellhead platform system 400 may comprise a controller 460, an integrated boosting and testing subsystem 430, and an integrated instrument gas and drain subsystem 440. These subsystems will now be described with reference to FIGS. 4-7.

Controller (e.g., Controller 460).

The wellhead platform system 400 may comprise a controller 460. An example embodiment of the controller 460 may be for use in dynamically and/or selectively operating the wellhead platform system 400, including dynamically and/or selectively configuring the wellhead platform system 400 to be in one or more of the modes depicted in FIG. 5 and dynamically and/or selectively configuring one or more of the subsystems and/or components as described in the present disclosure. Some or all of the configuring may be performed dynamically by the controller 460 and/or selectively by manual commands (such as via an operator console or interface, not shown) based on at least a measured WHFP. The measured WHFP may be a real-time, delayed, and/or interpolated measurement or value.

In an example embodiment, the controller 460 may be operable to receive and/or determine, either continuously, intermittently, and/or periodically, a measured value of the WHFP. The controller 460 may then be operable to dynamically and/or selectively configure the wellhead platform system 400 to be in the well testing mode 502*a* when the WHFP is determined to be greater than or equal to one or more test mode threshold values (or "test threshold value" or "testing threshold value"). The testing threshold values may be values between about 3 to 60 barg, such as about 3 barg for the unloading mode (506), about 5 barg for the low pressure mode (504) (in example embodiments wherein the first stage compressor subsystem 436*a* and second stage compressor subsystem 436*b* are configurable to be in a parallel configuration, which will be further discussed later), about 10 barg for the low pressure mode (504) (in example embodiments wherein the first stage compressor subsystem 436*a* and second stage compressor subsystem 436*b* are configurable to be in a series configuration, which will be further discussed later), and about 20 barg for the production mode (502). In an example embodiment, the controller 460 may be operable to dynamically and/or selectively configure the wellhead platform system 400 to be in the low pressure mode 504 when the WHFP is determined to be between a first threshold value and a second threshold value. The first threshold value may be about 20 barg, and the second threshold value may be between about 3 to 5 barg, such as 5 barg. In other words, the controller 460 may configure the wellhead platform system 400 to be in the low pressure mode 504 when the WHFP is determined to be between about 3 to 20. As will be explained later, the low pressure mode 504 may be further broken down into 2 modes (low pressure and very low pressure) having thresholds of about 3 to 5 barg and 8 to 10 barg, respectively. In an example embodiment, the controller 460 may be operable to dynamically and/or selectively configure the wellhead platform system 400 to be in the unloading mode 506 when the WHFP is determined to be equal to or less than a third threshold value (or the second threshold value). The third threshold value may be between about 3 to 5 barg, such as 3.5 barg. In other words, the controller 460 may configure the wellhead platform system 400 to be in the unloading mode 506 when the WHFP is determined to be lesser than about 3.5 to 5.

The controller 460 may be any machine, computing device, or communication device, and may include a server, computer, laptop computer, portable computing device, node, instance, host, virtual machine, or combination of some or all of these in a networked computing environment. A network or cloud 470 may be provided so as to enable the controller 470 to, among other things, perform configuring of one or more subsystems and/or components of the wellhead platform system 400 (including those described above and in the present disclosure) and communicate with one or more other controllers and/or computing devices (not shown). Network 470 may be a collection of computing devices and/or machines connected by communication channels that facilitate communications between controllers, computing devices, and/or machines and allow for controllers, computing devices, and/or machines to share resources.

Network 470 may also refer to a communication medium between processes on the same controller, computing device, and/or machine.

Integrated Boosting and Testing Subsystem (e.g., Integrated Boosting and Testing Subsystem 430).

The wellhead platform system 400 may further comprise an integrated boosting and testing subsystem 430. The integrated boosting and testing subsystem 430 may be dynamically and/or selectively configurable to receive extracted raw mixtures from the boosting and testing manifold 430'. An example embodiment of the integrated boosting and testing subsystem 430 may be dynamically and/or selectively configurable to provide extracted raw mixtures directly to the export line 410 (during well testing mode 502a) when the WHFP is sufficiently high. An example embodiment of the integrated boosting and testing subsystem 430 may also be dynamically and/or selectively configurable to assist in extracting of raw mixtures (during low pressure mode 504) in not only low flowing pressure conditions (such as when the WHFP is between about 10 to 20 barg), but also in very low pressure conditions (such as when the WHFP is between about 3 to 10 barg). An example embodiment of the integrated boosting and testing subsystem 430 may also be dynamically and/or selectively configurable to perform unloading operations in the final stages of the extracting process (such as when the WHFP is below about 3 to 5 barg) (during unloading mode 506).

An example embodiment of the integrated boosting and testing subsystem 430 may comprise a separator subsystem 432, a scrubber subsystem 434, a first stage compressor subsystem 436a, and a second stage compressor subsystem 436b. The integrated boosting and testing subsystem 430 may further comprise one or more coolers 433a, 433b, and 433c, one or more dampeners 435a, 435b, 435c, and 435d, and/or one or more scrubber 437. The integrated boosting and testing subsystem 430 may further comprise one or more valves (such as valves 431a, 431b), one or more sensors (such as gas and liquid flow meters), and/or one or more watercut meter 438. These subsystems of the integrated boosting and testing subsystem 430 will now be described with reference to FIGS. 4-7.

1. Separator Subsystem (e.g., Separator Subsystem 432)

As illustrated in FIG. 4, an example embodiment of the separator subsystem 432 of the integrated boosting and testing subsystem 430 may comprise a separator assembly 432a and a separator blowcase assembly 432b.

The separator assembly 432a may comprise a separator inlet section 432a1 for receiving the extracted multi-phase raw mixtures from the boosting and testing manifold 430'. The separator assembly 432a may further comprise a separator container body 432a'. The separator container body 432a' may be operable to house the received multi-phase raw mixture. The separator assembly 432a may further comprise a separator gas outlet section 432a2 for separating gas from the multi-phase raw mixture housed in the separator container body 432a'. The separator gas outlet section 432a2 may be dynamically and/or selectively configurable to provide the separated gas to the scrubber subsystem 434 or the export line 410 (as further described below). The separator assembly 432a may further comprise a separator liquid outlet section 432a3 for separating liquid from the multi-phase raw mixture housed in the separator container body 432a'. The separator liquid outlet section 432a3 may provide the separated liquid to the separator blowcase assembly 432b.

When in the well testing mode 502a, the separator gas outlet section 432a2 may be dynamically and/or selectively configurable to provide gas directly to the export line 410 in example embodiments (such as by commanding one or more valves 431a). In this regard, the gas provided by the separator gas outlet section 432a2 may bypass the scrubber subsystem 434 when in the well testing mode 502a. When in the low pressure mode 504 or unloading mode 506, the separator gas outlet section 432a2 may be dynamically and/or selectively configurable to provide gas directly to the scrubber subsystem 434 (i.e., the scrubber inlet section 434a1 of the scrubber assembly 434a) in example embodiments (such as by commanding one or more valves 431). In this regard, the gas provided by the separator gas outlet section 432a2 may not be fed directly to the export line 410 when in the low pressure mode 504 or unloading mode 506.

The separator blowcase assembly 432b may be operable to receive liquid separated from the separator assembly 432a. The separator blowcase assembly 432b may comprise a separator blowcase container body 432b'. The separator blowcase assembly 432b may further comprise a separator blowcase liquid inlet section 432b1 for receiving liquid from the separator liquid outlet section 432a3 into the separator blowcase container body 432b'. The separator blowcase assembly 432b may further comprise a separator blowcase liquid outlet section 432b3. The separator blowcase assembly 432b may further comprise a separator blowcase gas inlet section 432b2. The separator blowcase gas inlet section 432b2 may be dynamically and/or selectively configurable to receive gas into the separator blowcase container body 432b' to push liquid housed in the separator blowcase container body 432b' through the separator blowcase liquid outlet section 432b3, such as when the wellhead platform system 400 is in the low pressure mode 504 or unloading mode 506. For example, the controller 460 may be operable to determine whether a liquid level in the separator blowcase container body 432b' reaches a predetermined level (and the wellhead platform system 400 is in the low pressure mode 504 or unloading mode 506), and when the predetermined level is reached (and the wellhead platform system 400 is in the low pressure mode 502 or unloading mode 502a), the controller 460 may be operable to enable the separator blowcase gas inlet section 432b2 to receive the gas into the separator blowcase container body 432b' to push the liquid housed in the separator blowcase container body 432b' through the separator blowcase liquid outlet section 432b3. The gas received into the separator blowcase gas inlet section 432b2 may be provided by the second stage compressor subsystem 436b in example embodiments. It is recognized in the present disclosure that such gas received into the separator blowcase gas inlet section 432b2 preferably comprises sufficiently high pressure to aid the insufficient flowing pressures and/or hydrostatic forces of the liquids in the separator blowcase container body 432b' (such as when the wellhead platform system 400 is in the low pressure mode 504 or unloading mode 506). The liquid pushed through the separator blowcase liquid outlet section 432b3 may be provided to the export line 410 in example embodiments. In example embodiments, one or more sensors 438 (such as one or more liquid flow meters, one or more gas flow meters, and/or one or more watercut meters) and one or more valves 431b may be provided at the output of the separator blowcase liquid outlet section 432b3 to, among other things, enable a determination of the percentage of water in the liquid. For example, when the wellhead platform system 400 is in the production mode 502 or well testing mode 502a, the WHFP will be sufficiently high and the output from the separator blowcase liquid outlet section 432b3 may be provided to the export line 410 via a first path (such as through one or more valve(s) 431*b*). On the other hand, when the wellhead platform system 400 is in the low pressure mode 504 or unloading mode 506, the WHFP will not be sufficient and the output from the separator blowcase liquid outlet section 432*b*3 will require assistance from the gas received into the separator blowcase gas inlet section 432*b*2. In such a situation, the output from the separator blowcase liquid outlet section 432*b*3 may be provided to the export line via a second path (such as through sensor(s) 438 and bypassing valve(s) 431*b*), which may enable a determination of, among other things, the condensate present in the output by determining a differential of the liquid and water contents passing therethrough (for example, liquid minus water content equals the condensate).

2. Scrubber Subsystem (e.g., Scrubber Subsystem 434)

As illustrated in FIG. 4, an example embodiment of the scrubber subsystem 434 of the integrated boosting and testing subsystem 430 may comprise a scrubber assembly 434*a* and a scrubber blowcase assembly 434*b*.

The scrubber assembly 434*a* may comprise a scrubber inlet section 434*a*1. The scrubber inlet section 434*a*1 may be connected to the separator gas outlet section 432*a*2 via one or more valves 431. When in the low pressure mode 504, the scrubber inlet section 434*a*1 may be dynamically and/or selectively configurable to receive gas separated by the separator gas outlet section 432*a*2. When in the unloading mode 506, the scrubber inlet section 434*a*1 may be dynamically and/or selectively configurable to receive gas directly from the export line 410.

In an example embodiment, a cooler 433*a* may be provided between the separator gas outlet section 432*a*2 and the scrubber inlet section 434*a*1. The cooler 433*a* may be operable to cool the gas separated by the separator gas outlet section 432*a*2 and condense any liquid present in the separated gas.

The scrubber assembly 434*a* may further comprise a scrubber container body 434*a*'. The scrubber container body 434*a*' may be operable to receive the separated gas and condensed liquid mixture. The scrubber assembly 434*a* may further comprise a scrubber gas outlet section 434*a*2 for separating gas. The scrubber gas outlet section 434*a*2 may provide the separated gas to the first stage compressor subsystem 436*a*. The scrubber assembly 434*a* may further comprise a scrubber liquid outlet section 434*a*3 for separating liquid. The scrubber liquid outlet section 434*a*3 may provide the separated liquid to the scrubber blowcase assembly 434*b*.

The scrubber blowcase assembly 434*b* may be operable to receive liquid separated from the scrubber assembly 434*a*. The scrubber blowcase assembly 434*b* may comprise a scrubber blowcase container body 434*b*'. The scrubber blowcase assembly 434*b* may further comprise a scrubber blowcase liquid inlet section 434*b*1 for receiving liquid from the scrubber liquid outlet section 434*a*3 into the scrubber blowcase container body 434*b*'. The scrubber blowcase assembly 434*b* may further comprise a scrubber blowcase liquid outlet section 434*b*3. The scrubber blowcase assembly 434*b* may further comprise a scrubber blowcase gas inlet section 434*b*2. The scrubber blowcase gas inlet section 434*b*2 may be dynamically and/or selectively configurable to receive gas into the scrubber blowcase container body 434*b*' to push liquid housed in the scrubber blowcase container body 434*b*' through the scrubber blowcase liquid outlet section 434*b*3, such as when the wellhead platform system 400 is in the low pressure mode 504 or unloading mode 506. For example, the controller 460 may be operable to determine whether a liquid level in the scrubber blowcase container body 434*b*' reaches a predetermined level (and the wellhead platform system 400 is in the low pressure mode 504 or unloading mode 506), and when the predetermined level is reached (and the wellhead platform system 400 is in the low pressure mode 504 or unloading mode 506), the controller 460 may be operable to enable the scrubber blowcase gas inlet section 434*b*2 to receive the gas into the scrubber blowcase container body 434*b*' to push the liquid housed in the scrubber blowcase container body 434*b*' through the scrubber blowcase liquid outlet section 434*b*3. The gas received into the scrubber blowcase gas inlet section 434*b*2 may be provided by the second stage compressor subsystem 436*b* in example embodiments. It is recognized in the present disclosure that such gas received into the scrubber blowcase gas inlet section 434*b*2 comprises sufficiently high pressure to aid the insufficient flowing pressures and/or hydrostatic forces of the liquids in the scrubber blowcase container body 434*b*' (such as when the wellhead platform system 400 is in the low pressure mode 504 or unloading mode 506). The liquid pushed through the scrubber blowcase liquid outlet section 434*b*3 may be provided to the export line 410 in example embodiments.

3. First Stage Compressor Subsystem (e.g., First Stage Compressor Subsystem 436*a*)

As illustrated in FIG. 4, an example embodiment of the first stage compressor subsystem 436*a* of the integrated boosting and testing subsystem 430 may comprise a first stage compressor gas inlet section 436*a*1, a first stage compressor 436*a*2 for compressing gas, and a first stage compressor gas outlet section 436*a*3.

The first stage compressor gas inlet section 436*a*1 may be configurable to receive gas from the scrubber gas outlet section 434*a*2. The first stage compressor 436*a*2 may then be configurable to compress the gas received from the scrubber gas outlet section 434*a*2.

In an example embodiment, a dampener 435*a* may be provided between the scrubber gas outlet section 434*a*2 and the first stage gas inlet section 436*a*1. The dampener 435*a* may be operable to prevent any surges in the gas provided by the scrubber gas outlet section 434*a*2.

The first stage compressor gas outlet section 436*a*3 may be configurable to output the gas compressed by the first stage compressor 436*a*2 when in the low pressure mode 504 or the unloading mode 506. The compressed gas outputted by the first stage compressor gas outlet section 436*a*3 may be provided to the second stage compressor subsystem 436*b*.

In an example embodiment, one or more components may be provided between the first stage compressor gas outlet section 436*a*3 and the second stage compressor subsystem 436*b*. For example, as illustrated in FIG. 4, a dampener 435*b* may be provided between the first stage compressor gas outlet section 436*a*3 and the second stage compressor subsystem 436*b*. The dampener 435*b* may be operable to prevent any surges in the compressed gas provided by the first stage compressor gas outlet section 436*a*3. A cooler 433*b* may also be provided between the first stage compressor gas outlet section 436*a*3 and the second stage compressor subsystem 436*b*. The cooler 433*b* may be operable to cool the compressed gas from the first stage compressor gas outlet section 436*a*3 and condense any liquid present in the compressed gas. A scrubber 437 may also be provided between the first stage compressor gas outlet section 436*a*3 and the second stage compressor subsystem 436*b*. A dampener 435*c* may also be provided between the first stage compressor gas outlet section 436*a*3 and the second stage gas inlet section 436*b*1. The dampener 435*c* may be operable to prevent any surges in gas provided by the first stage compressor gas outlet section 436a3 (and/or dampener 435b and/or cooler 433b and/or scrubber 437 and/or dampener 435c).

4. Second Stage Compressor Subsystem (e.g., Second Stage Compressor Subsystem 436b)

As illustrated in FIG. 4, an example embodiment of the second stage compressor subsystem 436b of the integrated boosting and testing subsystem 430 may comprise a second stage compressor gas inlet section 436b1, a second stage compressor 436b2 for compressing gas, and a second stage compressor gas outlet section 436b3.

The second stage compressor gas inlet section 436b1 may be configurable to receive the compressed gas from the first stage compressor gas outlet section 436a3. The second stage compressor 436b2 may be configurable to further compress the compressed gas received from the first stage compressor gas outlet section 436a3. The second stage compressor gas outlet section 436b3 may then be configurable to output the gas compressed by the second stage compressor 436b2 when in the low pressure mode 504 or the unloading mode 506.

In an example embodiment, a dampener 435d may be provided at the output of the second stage compressor gas outlet section 436b3. The dampener 435d may be operable to prevent any surges in the further compressed gas provided by the second stage compressor gas outlet section 436b3. Furthermore, a cooler 433c may be provided at the output of the second stage compressor gas outlet section 436b3. The cooler 433c may be operable to cool the further compressed gas from the second stage compressor gas outlet section 436b3 and condense any liquid present in the further compressed gas.

In an example embodiment, the second stage compressor gas outlet section 436b3 may be dynamically and/or selectively configured to provide the further compressed gas to the separator blowcase gas inlet section 432b2 and/or the scrubber blowcase gas inlet section 434b2. For example, the controller 460 may be operable to determine whether a liquid level in the separator blowcase container body 432b' reaches a predetermined level, and when the predetermined level is reached, the controller 460 may be operable to enable the second stage compressor gas outlet section 436b3 (and/or dampener 435d and/or cooler 433c) to provide the further compressed gas to the separator blowcase gas inlet section 432b2 (to receive the gas into the separator blowcase container body 432b' to push the liquid housed in the separator blowcase container body 432b' through the separator blowcase liquid outlet section 432b3). Similarly, the controller 460 may be operable to determine whether a liquid level in the scrubber blowcase container body 434b' reaches a predetermined level, and when the predetermined level is reached, the controller 460 may be operable to enable the second stage compressor gas outlet section 436b3 (and/or dampener 435d and/or cooler 433c) to provide the further compressed gas to the scrubber blowcase gas inlet section 434b2 (to receive the gas into the scrubber blowcase container body 434b' to push the liquid housed in the scrubber blowcase container body through the scrubber blowcase liquid outlet section 434b3).

Integrated Instrument Gas and Drain Subsystem (e.g., Integrated Instrument Gas and Drain Subsystem 440).

The wellhead platform system 400 may further comprise an integrated instrument gas and drain subsystem 440. An example embodiment of the integrated instrument gas and drain subsystem 440 may be dynamically and/or selectively configurable to receive and accumulate liquid separated in the wellhead platform system 400. The integrated instrument gas and drain subsystem 440 may be further operable to discharge such accumulated liquid using high pressured gas tapped from the export line 410 in a similar manner as the liquid in the separator blowcase container body 432b' and the scrubber blowcase container body 434b' are discharged using the high pressured compressed gas from the second stage compressor subsystem 436b (as described above and in the present disclosure). For example, the integrated instrument gas and drain subsystem 440 may comprise standpipe 442 having a standpipe body 442', gas inlet section 442b for receiving high pressure gas from the export line 410 into the standpipe body 442', liquid inlet section 442a for receiving liquid drains on the wellhead platform system 400 into the standpipe body 442', liquid inlet section 442d for receiving liquid separated from other feeds (such as gas from the export line 410 used for other instruments), and liquid outlet section 442c for separating liquid from the standpipe body 442' to the export line 410.

FIG. 7A, FIG. 7B, FIG. 7C, and FIG. 7D illustrate an example embodiment of a method 700 of operating the wellhead platform system 400 to extract multi-phase raw mixtures via a plurality of wellheads and provide same to an export line 410. The method 700 may comprise measuring a WHFP 702, such as by using one or more gas flow meters, etc. Once measured, the method 700 may determine whether the WHFP is greater than or equal to the test mode or testing threshold value (e.g., production mode 502 and/or well test mode 502a) 710, the WHFP is between the first threshold value and the second threshold value (e.g., low pressure mode 504) 720, or the WHFP is equal to or less than the third threshold value (or second threshold value) (e.g., unloading mode 506) 730.

Production Mode (e.g., Mode 502).

During early and mid stages of raw mixture extraction (e.g., mode 502) when a reservoir inherently possesses sufficiently high flowing pressure (such as when the WHFP is measured to be between about 20 to 60 barg), the extraction of raw mixtures via wellheads 402 may be performed by actuating appropriate valve(s) so as to enable raw mixtures to traverse to the export line 410 via the production manifold 410'. For example, valve 410a' may be actuated to be in the opened position and valve 430a' may be actuated to be in the closed position.

Well Testing Mode (e.g., Mode 502a, 710)

During extraction of raw mixtures, it is often desired and/or required to perform intermittent, periodic, and/or continuous testing and measuring of production parameters of extracted raw mixtures (e.g., mode 502a and 710), such as gas, condensate, water flowrate, pressure, and temperature. An example embodiment of a well testing mode (e.g., mode 502a and 710) may be performed by actuating appropriate valves to enable raw mixtures to traverse to the integrated boosting and testing subsystem 430 via the integrated boosting and testing manifold 430' when the wellhead platform system 400 is operating in one or more of the other modes (i.e., during the production mode 502, the low pressure mode 504, or the unloading mode 506, such as when the WHFP is measured to be within the testing threshold value of between about 3 to 60 barg). For example, valve 430a' may be actuated to be in the opened position and valve 410a' may be actuated to be in the closed position.

When in the well testing mode (e.g., mode 502a and 710), the separator subsystem 432a may be configured to receive multi-phase raw mixtures from the boosting and testing manifold 430' extracted via the wellheads (e.g., action 712). The separator subsystem 432a may then be configurable to separate gas and liquid from the received multi-phase raw mixture (e.g., action 714). The separator subsystem 432a may be dynamically and/or selectively configurable to provide the separated gas directly to the export line 410 (e.g., action 716) and bypass the scrubber subsystem 434a (during production mode 502), or indirectly via the separator blowcase assembly 434b and/or scrubber subsystem 434a (during low pressure mode 504 or unloading mode 506). The separator subsystem 432a may also be configurable to provide the separated liquid directly to the separator blowcase assembly 434b.

Low Pressure Mode (e.g., Mode 504, 720)

When in the low pressure mode (e.g., mode 504 and 720), the separator assembly 432a may be configurable to receive multi-phase raw mixtures from the boosting and testing manifold 430' extracted via the wellheads (e.g., action 721). The separator assembly 432a may then be configurable to separate gas and liquid from the received multi-phase raw mixture (e.g., action 722). The separator assembly 432a may be configurable to provide the separated liquid to the separator blowcase assembly 432b (e.g., action 723a). The separator assembly 432a may also be dynamically and/or selectively configurable to provide the separated gas to the scrubber subsystem 434 via the cooler 433a (e.g., action 723b). The cooler 433a may be configurable to receive the separated gas and cool the separated gas to condense liquid in the separated gas. The cooler 433a may be further configurable to provide the cooled gas and liquid mixture to the scrubber subsystem 434 (e.g., action 724). The scrubber assembly 434a may be configurable to receive the cooled gas and liquid mixture. The scrubber assembly 434a may be configurable to further separate the gas and liquid from the received cooled gas and liquid mixture (e.g., action 725). The scrubber assembly 434a may be configurable to provide the separated liquid to the scrubber blowcase assembly 434b (e.g., action 726a). The scrubber assembly 434a may also be configurable to provide the separated gas to the first stage compressor subsystem 436a (e.g., action 726b). The first stage compressor subsystem 436a may be configurable to receive the separated gas. The first stage compressor subsystem 436a may be configurable to compress the received gas (e.g., action 727a) and provide the compressed gas to the second stage compressor subsystem 436b (e.g., action 727b). The second stage compressor subsystem 436b may be configurable to receive the compressed gas. The second stage compressor subsystem 436b may then be configurable to further compress the compressed gas (e.g., action 728a). The second stage compressor subsystem 436b may then be dynamically and/or selectively configurable to provide the further compressed gas to the separator blowcase assembly 432b and/or the scrubber blowcase assembly 434b (e.g., action 728b). The providing of the further compressed gas enables the separator blowcase assembly 432b and/or the scrubber blowcase assembly 434b to discharge the liquid it received, as described above.

In example embodiments, dampener 435a may be provided between the scrubber subsystem 434 and the first stage compressor subsystem 436a to prevent surges in the gas provided by the scrubber subsystem 434. One or more other dampeners 435b and 435c may also be provided between the first stage compressor subsystem 436a and the second stage compressor subsystem 436b to prevent surges in the compressed gas provided by the first stage compressor subsystem 436a. Another dampener 436d may also be provided at the output of the second stage compressor subsystem 436b to prevent surges in the further compressed gas provided by the second stage compressor subsystem 436b. A second cooler 433b may also be provided between the first stage compressor subsystem 436a and the second stage compressor subsystem 436b to cool the compressed gas and condense any liquid that may still remain in the compressed gas. Another cooler 433c may also be provided at the output of the second stage compressor subsystem 436b to cool the further compressed gas and condense any liquid that may still remain in the further compressed gas. Furthermore, a scrubber 437 may be provided between the first stage compressor subsystem 436a and the second stage compressor subsystem 436b.

Unloading Mode (e.g., Mode 506, 730)

When in the unloading mode (e.g., mode 506 and 730), the separator assembly 432a may be configurable to receive multi-phase raw mixtures from the boosting and testing manifold 430' extracted via the wellheads (e.g., action 731). The separator assembly 432a may then be configurable to separate liquid from the received multi-phase raw mixture (e.g., action 732). The separator assembly 432a may be configurable to provide the separated liquid to the separator blowcase assembly 432b (e.g., action 733a). The export line 410 may be dynamically and/or selectively configurable to provide high flowing pressure gas to the cooler 433a or directly to the scrubber subsystem 434 (e.g., action 733b). When the export line 410 is configured to provide gas to the cooler 433a, the cooler 433a may be configurable to receive the gas from the export line 410 and cool the gas to condense liquid in the separated gas. The cooler 433a may be further configurable to provide the cooled gas and liquid mixture to the scrubber subsystem 434 (e.g., action 734). When the export line 410 is configured to provide gas directly to the scrubber subsystem 434, the scrubber assembly 434a may be configurable to receive the gas from the export line 410.

The scrubber subsystem 434 may be configurable to separate the gas and liquid from the gas it received (received from either the cooler 433a or directly from the export line 410) (e.g., action 735). The scrubber assembly 434a may be configurable to provide the separated liquid to the scrubber blowcase assembly 434b (e.g., action 736a). The scrubber assembly 434a may also be configurable to provide the separated gas to the first stage compressor subsystem 436a (e.g., action 736b). The first stage compressor subsystem 436a may be configurable to receive the separated gas. The first stage compressor subsystem 436a may be configurable to compress the received gas (e.g., action 737a) and provide the compressed gas to the second stage compressor subsystem 436b (e.g., action 737b). The second stage compressor subsystem 436b may be configurable to receive the compressed gas. The second stage compressor subsystem 436b may then be configurable to further compress the compressed gas (e.g., action 738a). The second stage compressor subsystem 436b may then be dynamically and/or selectively configurable to provide the further compressed gas to the separator blowcase assembly 432b and/or the scrubber blowcase assembly 434b (e.g., action 738b). The providing of the further compressed gas enables the separator blowcase assembly 432b and/or the scrubber blowcase assembly 434b to discharge the liquid it received, as described above.

In example embodiments, dampener 435a may be provided between the scrubber subsystem 434 and the first stage compressor subsystem 436a to prevent surges in the gas provided by the scrubber subsystem 434. One or more other dampeners 435b and 435c may also be provided between the first stage compressor subsystem 436a and the second stage compressor subsystem 436b to prevent surges in the compressed gas provided by the first stage compressor subsystem 436a. Another dampener 436d may also be provided at the output of the second stage compressor subsystem 436b to prevent surges in the further compressed gas provided by the second stage compressor subsystem 436*b*. A second cooler 433*b* may also be provided between the first stage compressor subsystem 436*a* and the second stage compressor subsystem 436*b* to cool the compressed gas and condense any liquid that may still remain in the compressed gas. Another cooler 433*c* may also be provided at the output of the second stage compressor subsystem 436*b* to cool the further compressed gas and condense any liquid that may still remain in the further compressed gas. Furthermore, one or more scrubbers 437 may be provided between the first stage compressor subsystem 436*a* and the second stage compressor subsystem 436*b*.

It is recognized in the present disclosure that example embodiments of the wellhead platform system 400, controller 460 for use in wellhead platform systems, and methods for operating wellhead platform systems disclosed above and in the present disclosure enable improvements over the wellhead platform system 200 and conventional wellhead platform systems known in the art. For example, improvements include, but are not limited to, reductions in space consumption and components/subsystems due as a direct result of, among other things, example embodiments of the integrated boosting and testing subsystem 430, integrated instrument gas and drain subsystem 440, and controller 460. With the said improvements, various subsystems and components may be eliminated, including the test separator subsystem 220, test separator manifold 220', closed drain subsystem 250, and associated components, including pumps (such as the closed drain pump 250*b*), valves (such as the valves 220*a*'), etc. Improvements also include, but are not limited to, enabling the further extraction of multi-phase raw mixtures from reservoirs in low pressure conditions and very low pressure conditions, such as when the WHFP is about or below 10 barg and in particular, when the WHFP is about or below 3 to 5 barg.

In some example embodiments, the separator blowcase assembly 432*b* and scrubber blowcase assembly 434*b* may be integrated into one unified blowcase assembly (not shown) without departing from the teachings of the present disclosure. The unified blowcase assembly may comprise a unified liquid inlet section operable to receive liquid from the separator assembly 432*a* and/or the scrubber assembly 434*a*. It is to be understood in the present disclosure that the unified blowcase assembly may be further operable to receive liquid from other aspects of the wellhead platform system without departing from the teachings of the present disclosure. The unified blowcase assembly may further comprise a unified blowcase container body. The unified blowcase assembly may further comprise a unified liquid outlet section. The unified blowcase assembly may further comprise a unified blowcase gas inlet section that may be dynamically and/or selectively configurable to receive high pressured gas from the second stage compressor subsystem 436*b* to push liquid housed in the unified blowcase container body through the unified blowcase liquid outlet section (such as when the wellhead platform system is in the low pressure mode or unloading mode). It is recognized in the present disclosure that such an embodiment may further reduce footprint and components/subsystems of the wellhead platform system.

In some example embodiments, the separator assembly 432*a* and scrubber assembly 434*a* may be integrated into one unified assembly (not shown) and the separator blowcase assembly 432*b* and scrubber blowcase assembly 434*b* may be integrated into one unified blowcase assembly (not shown) without departing from the teachings of the present disclosure. The unified assembly may comprise a unified inlet section that may be dynamically and/or selectively configurable to receive multi-phase raw mixtures from the boosting and testing manifold 430' when in the production mode, well testing mode, and low pressure mode. The unified inlet section may be further dynamically and/or selectively configurable to receive the said multi-phase raw mixtures from the boosting and testing manifold 430' and high pressured gas from the export line when in the unloading mode. The unified assembly may further comprise a unified assembly container body. The unified assembly may further comprise a unified liquid outlet section operable to separate liquid from the contents housed in the unified assembly container body and output the separated liquid to the unified blowcase assembly. The unified assembly may further comprise a unified gas outlet section operable to separate gas from the contents housed in the unified assembly container body and output the separated gas to the first stage compressor subsystem 436*a*. The first stage compressor subsystem 436*a* may then compressed the received gas, provide the compressed gas to the second stage compressor subsystem 436*b*, and the second stage compressor subsystem 436*b* may further compress the received compressed gas in the same manner as described above and in the present disclosure. The unified blowcase assembly may comprise a unified liquid inlet section operable to receive liquid separated from the unified assembly. The unified blowcase assembly may further comprise a unified blowcase container body. The unified blowcase assembly may further comprise a unified liquid outlet section. The unified blowcase assembly may further comprise a unified blowcase gas inlet section that may be dynamically and/or selectively configurable to receive high pressured gas from the second stage compressor subsystem 436*b* to push liquid housed in the unified blowcase container body through the unified blowcase liquid outlet section. It is recognized in the present disclosure that such an embodiment may further reduce footprint and components/subsystems of the wellhead platform system.

Figure 8:
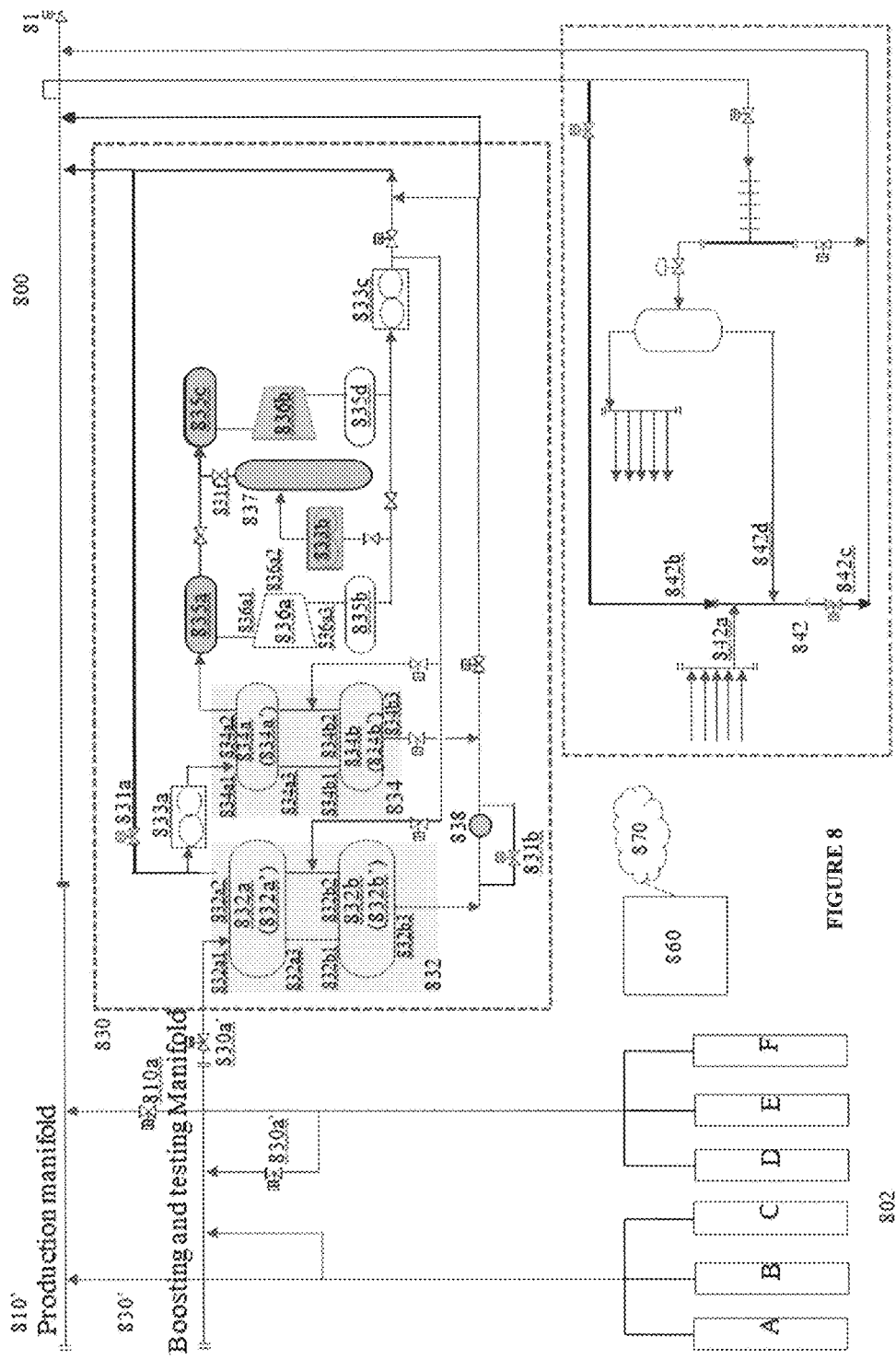
FIG. 8 is an example functional diagram of another example embodiment of a wellhead platform system.

In another example embodiment, as illustrated in FIG. 8, the wellhead platform system 800 may be dynamically and/or selectively configurable to operate the first stage compressor subsystem 836*a* and the second stage compressor subsystem 836*b* in either a parallel configuration or series configuration based on, among other things, the WHFP. For example, when the WHFP is determined by the controller 860 to be in a low pressure range, such as between about 8 to 20 barg (or other ranges, such as 10 to 20 barg), the controller 860 may be operable to dynamically and/or selectively configure the first stage compressor subsystem 836*a* and the second stage compressor subsystem 836*b* to be in a parallel configuration. For example, the controller 860 may be operable to configure, among other things, gas to flow through valves 831*c* and 831*f* and gas to not flow through valves 831*d* and 831*e*. When the WHFP is determined by the controller 860 to be in a very low pressure range, such as between about 3 to 10 barg (or other ranges, such as 5 to 8 barg), the controller 860 may be operable to dynamically and/or selectively configure the first stage compressor subsystem 836*a* and the second stage compressor subsystem 836*b* to be in a series configuration. For example, the controller 860 may be operable to configure, among other things, gas to flow through valves 831*d* and 831*e* and gas to not flow through valves 831*c* and 831*f*. Other configurations are also contemplated for the wellhead platform system 400 and 800 without departing from the teachings of the present disclosure, such as wellhead platform system 400 and 800 comprising the first stage compressor subsystem 836a, the second stage compressor subsystem 836b, other additional compressor subsystems (not shown), and other valve configurations. For example, a third stage compressor subsystem (not shown) may also be included in the wellhead platform system 400 or 800, and the controller 460 and 660 may be operable to dynamically and/or selectively configure two or more of the first stage compressor subsystem 436a and 836a, the second stage compressor subsystem 436b and 836b, and/or the third stage compressor subsystem to be in a series configuration and/or parallel configuration.

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, as referred to herein, a controller 460 may be any computing device or communication device, and may include a virtual machine, computer, node, instance, host, or machine in a networked computing environment. Also as referred to herein, a network or cloud may be a collection of machines connected by communication channels that facilitate communications between machines and allow for machines to share resources. Network may also refer to a communication medium between processes on the same machine. Also as referred to herein, a network element, node, or server may be a machine deployed to execute a program operating as a socket listener and may include software instances.

For example, "assembly", "apparatus", "portion", "segment", "member", "body", "section", "subsystem", "system", or other similar terms should generally be construed broadly to include one part or more than one part attached or connected together.

Memory (or storage or database) may comprise any collection and arrangement of volatile and/or non-volatile components suitable for storing data. For example, memory may comprise random access memory (RAM) devices, read-only memory (ROM) devices, magnetic storage devices, optical storage devices, and/or any other suitable data storage devices. In particular embodiments, memory may represent, in part, computer-readable storage media on which computer instructions and/or logic are encoded. Memory may represent any number of memory components within, local to, and/or accessible by a processor.

Various terms used herein have special meanings within the present technical field. Whether a particular term should be construed as such a "term of art" depends on the context in which that term is used. For example, "connect", "connected", "connecting", "connectable", "attach", "attached", "attaching", "attachable", "secure", "secured", "securing", "securable", "lock", "locked", "locking", "lockable", "anchor", "anchored", "anchoring", "anchorable", "install", "installed", "installing", "installable", "couple", "coupled", "coupling", "in communication with", "communicating with", "associated with", "associating with", or other similar terms should generally be construed broadly to include situations where attachments, connections, installations, and anchoring are direct between referenced elements or through one or more intermediaries between the referenced elements. As another example, "un-connect," "un-connected", "un-connecting", "un-connectable", "un-attach", "un-attached", "un-attaching", "un-attachable", "un-secure", "un-secured", "un-securing", "un-securable", "unlock", "unlocked", "unlocking", "unlockable", "un-anchor", "un-anchored", "un-anchoring", "un-anchorable", "uninstall", "uninstalled", "uninstalling", "uninstallable", "uncouple", "uncoupled", "uncoupling", or other similar terms should generally be construed broadly to include situations where separation, removal, and detaching are direct between referenced elements or from one or more intermediaries between the referenced elements. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time", "equivalent", "during", "complete", and the like should be understood to mean "substantially at the time", "substantially equivalent", "substantially during", "substantially complete", etc., where "substantially" means that such comparisons, measurements, and timings are practicable to accomplish the implicitly or expressly stated desired result.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A system for use in a wellhead platform to extract multi-phase raw mixtures via a plurality of wellheads and provide same to an export line, the system comprising:
   a controller operable to dynamically configure the system to be in one of a well testing mode, a low pressure mode, or an unloading mode based on at least a received wellhead flowing pressure (WHFP) measurement, wherein:
      the well testing mode is configured when the WHFP is between about 3 to 60 barg;
      the low pressure mode is configured when the WHFP is between about 3 to 20 barg; and
      the unloading mode is configured when the WHFP is equal to or less than about 3 to 5 barg;
   a separator subsystem including:
      a separator assembly having a separator inlet section for receiving the extracted multi-phase raw mixtures, a separator container body for housing the received multi-phase raw mixture, a separator gas outlet section for separating gas, and a separator liquid outlet section for separating liquid, wherein the separator gas outlet section is configurable by the controller to provide gas directly to the export line when in the well testing mode;

a separator blowcase assembly having a separator blowcase container body, a separator blowcase liquid inlet section connected to the separator liquid outlet section for receiving liquid into the separator blowcase container body, a separator blowcase liquid outlet section, and a separator blowcase gas inlet section;

a scrubber subsystem including:

a scrubber assembly having a scrubber inlet section, a scrubber container body, a scrubber gas outlet section for separating gas, and a scrubber liquid outlet section for separating liquid, wherein:

the scrubber inlet section is configurable by the controller to receive gas directly from the separator gas outlet section when in the low pressure mode; and the scrubber inlet section is configurable by the controller to receive gas directly from the export line when in the unloading mode; and a scrubber blowcase assembly having a scrubber blowcase container body, a scrubber blowcase liquid inlet section connected to the scrubber liquid outlet section for receiving liquid into the scrubber blowcase container body, a scrubber blowcase liquid outlet section, and a scrubber blowcase gas inlet section;

a first stage compressor subsystem comprising a first stage compressor gas inlet section, a first stage compressor for compressing gas, and a first stage compressor gas outlet section, wherein the first stage compressor gas inlet section is configurable by the controller to receive gas from the scrubber gas outlet section, the first stage compressor is configurable to compress the received gas, and the first stage compressor gas outlet section is configurable to output the compressed gas when in the low pressure mode or the unloading mode; and a second stage compressor subsystem comprising a second stage compressor gas inlet section, a second stage compressor, and a second stage compressor gas outlet section, wherein the second stage compressor gas inlet section is configurable by the controller to receive gas from the first stage compressor outlet section, the second stage compressor is configurable to further compress the received compressed gas, and the second stage compressor gas outlet section is configurable to output the further compressed gas to the separator blowcase gas inlet section and the scrubber blowcase gas inlet section when in the low pressure mode or the unloading mode.

2. The system of claim 1, further comprising an integrated instrument gas and drain subsystem having:

a standpipe gas inlet section for receiving gas from the export line;

an instrument liquid inlet section for receiving liquid drains on the system;

a standpipe container body for housing the received liquid; and a standpipe liquid outlet section for discharging the liquid housed in the standpipe container body via the gas received in the standpipe gas inlet section from the export line.

3. The system of claim 1, further comprising a gas flow meter operable to measure gas separated by the separator gas outlet section and a liquid flow meter operable to measure liquid separated by the separator blowcase liquid outlet section.

4. The system of claim 1, further comprising an inter-stage cooler and scrubber subsystem connected between the first stage compressor gas outlet section and the second stage compressor gas inlet section, the inter-stage cooler and scrubber subsystem operable to receive the compressed gas from the first stage compressor gas outlet section and further remove liquid from the received compressed gas before providing the compressed gas to the second stage compressor gas inlet section.

5. The system of claim 1, further comprising:

a first valve configurable by the controller, wherein:

the separator gas outlet section is configured to provide gas directly to the export line in the well testing mode when the controller configures the first valve to direct gas outputted from the separator gas outlet section directly to the export line and bypass the scrubber gas inlet section; and the separator gas outlet section is configured to provide gas directly to the scrubber gas inlet section in the low pressure mode when the controller configures the first valve to direct gas outputted from the separator gas outlet section directly to the scrubber gas inlet section and not fed directly to the export line;

a second valve configurable by the controller, wherein the scrubber gas inlet section is configured to receive gas directly from the export line in the unloading mode when the controller configures the second valve to direct gas from the export line directly to the scrubber gas inlet section;

a third valve configurable by the controller, wherein the second stage compressor gas outlet section is configured to provide gas to the separator blowcase gas inlet section in the low pressure mode or the unloading mode when the controller determines that a liquid level in the separator blowcase container body exceeds a first predetermined threshold level; and a fourth valve configurable by the controller, wherein the second stage compressor gas outlet section is configured to provide gas to the scrubber blowcase gas inlet section in the low pressure mode or the unloading mode when the controller determines that a liquid level in the scrubber blowcase container body exceeds a second predetermined threshold level.

* * * * *